US009988527B2

(12) United States Patent
Barsotti et al.

(10) Patent No.: US 9,988,527 B2
(45) Date of Patent: Jun. 5, 2018

(54) IMPACT RESISTANT TRANSPARENT THERMOPLASTIC COMPOSITIONS

(71) Applicants: Arkema France, Colombes (FR); Robert J. Barsotti, Drexel Hill, PA (US)

(72) Inventors: Robert J. Barsotti, Newtown Square, PA (US); Noah E. Macy, Royersford, PA (US); Mark A. Aubart, West Chester, PA (US); Robert A. Wanat, Langhorne, PA (US); Paul D. Fellenger, Denver, PA (US); Florence Mehlmann, Berwyn, PA (US); Thomas F. Roland, Zionsville, PA (US)

(73) Assignee: Arkema France, Colombes (FR)

( * ) Notice: Subject to any disclaimer, the term of this patent is extended or adjusted under 35 U.S.C. 154(b) by 0 days. days.

(21) Appl. No.: 14/435,873

(22) PCT Filed: Oct. 15, 2013

(86) PCT No.: PCT/US2013/064914
§ 371 (c)(1),
(2) Date: Apr. 15, 2015

(87) PCT Pub. No.: WO2014/062601
PCT Pub. Date: Apr. 24, 2014

(65) Prior Publication Data
US 2015/0299454 A1    Oct. 22, 2015

Related U.S. Application Data

(60) Provisional application No. 61/714,409, filed on Oct. 16, 2012.

(51) Int. Cl.
| | | |
|---|---|---|
| *C08L 51/00* | (2006.01) | |
| *C08F 265/06* | (2006.01) | |
| *C08L 51/06* | (2006.01) | |
| *C08J 3/00* | (2006.01) | |
| *C08L 33/12* | (2006.01) | |
| *C08L 67/04* | (2006.01) | |

(52) U.S. Cl.
CPC .......... *C08L 51/003* (2013.01); *C08F 265/06* (2013.01); *C08J 3/005* (2013.01); *C08L 33/12* (2013.01); *C08L 51/06* (2013.01); *C08L 67/04* (2013.01); *C08J 2333/12* (2013.01); *C08J 2351/00* (2013.01); *C08J 2367/04* (2013.01); *C08L 2201/10* (2013.01); *C08L 2205/03* (2013.01); *C08L 2205/06* (2013.01); *C08L 2207/53* (2013.01)

(58) Field of Classification Search
CPC .......... C08F 265/06; C08L 33/12; C08L 67/04
See application file for complete search history.

(56) References Cited

U.S. PATENT DOCUMENTS

| | | | |
|---|---|---|---|
| 3,661,994 A | 5/1972 | Hwa et al. | |
| 4,521,568 A | 6/1985 | Ori et al. | |
| 5,096,995 A | 5/1992 | Fukumoto et al. | |
| 5,318,737 A * | 6/1994 | Trabert | B32B 27/30 264/173.16 |
| 7,589,151 B2 | 9/2009 | Aoki et al. | |
| 8,183,321 B2 | 5/2012 | Babcock et al. | |
| 2003/0216510 A1 | 11/2003 | Wanat et al. | |
| 2005/0137296 A1* | 6/2005 | Ryoo | C08F 279/02 524/88 |
| 2006/0175585 A1* | 8/2006 | Drotleff | G02B 6/1221 252/582 |
| 2007/0276090 A1* | 11/2007 | Aoki | C08L 33/12 525/70 |
| 2009/0018237 A1 | 1/2009 | Fujii et al. | |
| 2009/0215960 A1 | 8/2009 | Jin et al. | |
| 2010/0092792 A1* | 4/2010 | Inari | B32B 15/08 428/458 |
| 2010/0144971 A1* | 6/2010 | Babcock | C08L 67/04 525/64 |
| 2011/0319553 A1* | 12/2011 | Yao | C08G 63/08 524/539 |
| 2012/0040185 A1* | 2/2012 | Topolkaraev | D01F 6/625 428/401 |
| 2014/0371375 A1* | 12/2014 | Chung | C08L 33/10 524/502 |

FOREIGN PATENT DOCUMENTS

JP       2001031852 A     2/2001

* cited by examiner

*Primary Examiner* — Jeffrey C Mullis
(74) *Attorney, Agent, or Firm* — Thomas F. Roland

(57) ABSTRACT

The invention relates to impact-modified, thermoplastic compositions, where the measured refractive index difference between the impact modifier particles and the matrix composition is greater than 0.008 units, yet a blend of the impact modifier particles in the matrix produces a transparent composition. The impact modifier particles are preferably impact modifier composite particles, being intimately blended with one or more polymeric process aids or dispersing aids. The polymeric process aids are physically or chemically attached to the impact modifier particles, forming composite particles that allow for facile powder isolation. The impact modifier composite particles provide improved physical, chemical, and/or rheological properties to the thermoplastic composition. Preferably the impact modifier particles of the invention are core-shell impact modifiers.

14 Claims, 1 Drawing Sheet

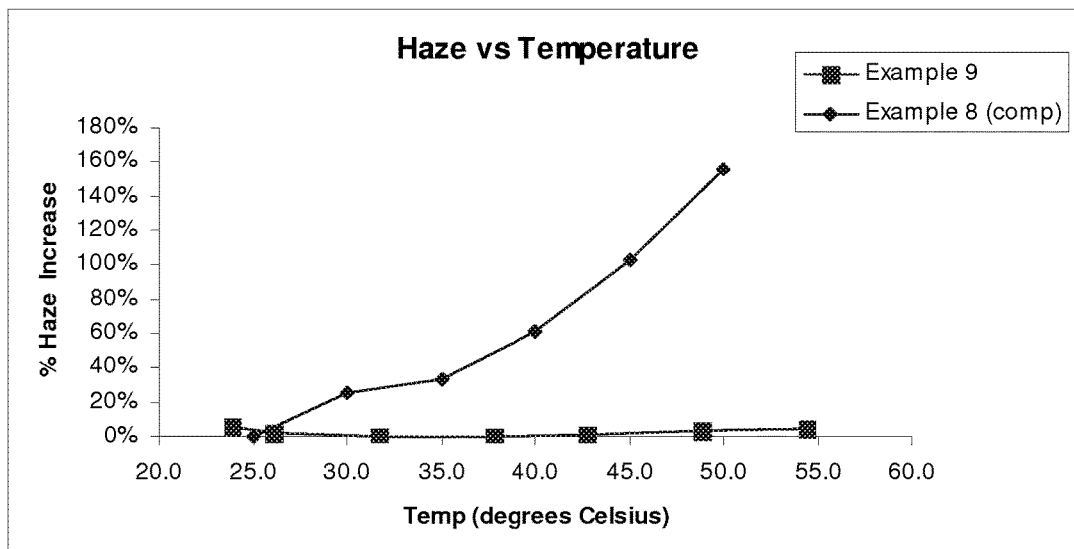

IMPACT RESISTANT TRANSPARENT THERMOPLASTIC COMPOSITIONS

This application claims benefit, under U.S.C. § 119 or § 365 of PCT Application Number PCT/US2013/064914, filed Oct. 15, 2013, and US Provisional Application No. 61/714,409, filed Oct. 16, 2012, said applications incorporated herein by reference.

FIELD OF THE INVENTION

The invention relates to impact-modified, thermoplastic compositions, where the measured refractive index difference between the impact modifier particles and the matrix composition is greater than 0.008 units, yet a melt blend of the impact modifier particles in the matrix produces a transparent composition. The impact modifier particles are preferably impact modifier composite particles, being intimately blended with one or more polymeric process aids or dispersing aids. The polymeric process aids are physically or chemically attached to the impact modifier particles, forming composite particles that allow for facile powder isolation. The impact modifier composite particles provide improved physical, chemical, and/or rheological properties to the thermoplastic composition. Preferably the impact modifier particles of the invention are core-shell impact modifiers.

BACKGROUND OF THE INVENTION

Acrylic compositions and articles made from acrylic compositions are well known for their clarity, lack of color, surface gloss, excellent processability, good scratch resistance and resistance to UV degradation. They are also well known for their low-impact strength or brittleness. It has become standard practice to incorporate toughening agents or impact modifiers in acrylic formulations to improve their mechanical properties.

One type of polymeric impact modifier is a sequentially polymerized acrylic composition. As described in U.S. Pat. No. 3,661,994, these are known as "core-shell" polymers, where either the core layer or an intermediate layer is made of a rubber polymer, and the outer-stage layer, also known as the shell layer, consists of a glassy polymer that is compatible with the acrylic polymer matrix. The core-shell polymers are formed in a latex, from which they are isolated into dry particles. Rubbery core impact modifiers typically suffer from relatively low modulus and relatively poor weatherability, which is detrimental to the impact modified acrylic formulation. U.S. Pat. No. 4,521,568 and US2003/0216510, describe core-shell polymers consisting of a hard glassy core layer, and one or more rubber intermediate layers to impact modify an acrylic polymer while retaining high modulus and good weathering resistance.

U.S. Pat. No. 7,580,151 and US 2009/0018237 describe transparent thermoplastic blends in which the refractive index of the impact modifier must be very close (within 0.005 or 0.008) of the matrix. This severely limits the possible formulation combinations to achieve a transparent product.

Surprisingly, it has been found that selected combinations of matrix polymer with impact modifier particles and/or impact modifier composite particles, having a refractive index difference of greater than 0.005, and even greater than 0.008, results in transparent, impact-modified compositions. Core-shell impact modifiers are especially preferred. By removing the narrow refractive index difference limits typically placed on materials incorporated into transparent products, the invention allows for the combination of a larger universe of materials and greater design flexibility. The refractive-index mismatched compositions can provide better dispersibility as well as improvements in physical and mechanical properties.

SUMMARY OF THE INVENTION

The invention relates to a transparent, impact-modified composition having:
a) 20-95 weight percent of a thermoplastic matrix, and
b) 5 to 80 weight percent of impact modifier particles,
where the difference in refractive index between the thermoplastic matrix and impact modifier particles is greater than +/−0.005, more preferably greater than +/0.008, and even more preferably greater than +/0.010.

The invention further relates to a process for producing a transparent, impact modified thermoplastic composition using impact modifiers, or composite impact modifiers, having a refractive index that is greater than +/−0.005, more preferably greater than +/0.008, and even more preferably greater than +/0.010 different than the thermoplastic polymer matrix.

The invention further relates to a process for producing a transparent impact modified thermoplastic composition using impact modifiers, or composite impact modifiers, where the impact modifier has at least one layer mismatched from a $2^{nd}$ layer by 0.005 to allow for improved haze vs. temperature properties.

BRIEF DESCRIPTION OF THE DRAWINGS

FIG. 1 demonstrates the dramatically lower increase in the haze with increasing temperature of a plaque made with the impact modifier particles of the present invention.

DETAILED DESCRIPTION OF THE INVENTION

The invention relates to transparent compositions formed from refractive index (R.I.) mismatched impact-modifier particles with thermoplastic matrix materials.

All percentages are weight percentages, unless otherwise stated, and all molecular weight are weight average molecular weights, unless otherwise stated.

A transparent blend (matrix plus impact modifier and/or impact modifier composite particles), as used herein means a product having: a haze of less than 60, preferably less than 40, more preferably less than 25, more preferably less than 15, even more preferably less than 10, most preferably less than 7, and even as low as 1-2 percent as measured by ASTM D1003 on a plaque having a thickness of 3 mm; and a total white light transmission (TWLT) is greater than 50, more preferably greater than 70, more preferably greater than 80, and most preferably greater than 85, as measured by ASTM D1003 on a plaque having a thickness of 3 mm.

The refractive index of the matrix polymer is measured on a molded piece of the polymer or polymer blend (without other additives), 1 mm in thickness. The refractive index is measured on a Abbe's refractometer according to ASTM-D542. Zinc chloride saturated aqueous solution is used as the contact liquid. The refractive index of the impact modifier composite particles is measured on a thin film of about 1 mm in thickness formed under heat and pressure (preliminary heating for 5 minutes at 150° C., followed by pressing for 1 minute and cooling for 2 minutes, using the powder of the impact modifier composite composition. The refractive index is measured on a Abbe's refractometer according to ASTM-D542. Zinc chloride saturated aqueous solution is used as the contact liquid. The difference in refractive index is calculated as the R.I. of the matrix polymer minus the R.I. of the impact modifier composite composition. The absolute value of this calculation is the difference in R.I. between the matrix and impact modifier composite particles.

Impact Modifier Particles

The impact modifier particle of the invention is preferably an impact modifier composite particle resulting from an impact modifier being intimately combined with dispersing aids and/or other process aids. The impact modifier particles are then combined with a refractive-index mismatched thermoplastic polymer matrix, to form an impact modified, transparent composition.

Useful impact modifiers of the invention are those known to one of ordinary skill in the art, and include, but are not limited to, core-shell impact modifiers, linear block copolymer, and nano-structured latex particles (such as those made by a controlled radical polymerization). Core-shell impact modifiers are preferred, and the following description will refer to core-shell impact modifiers, though the principles described apply also to other types of impact modifiers.

The composite impact modifier of the invention is a multi-stage, sequentially-produced polymer having a particle structure, and preferably a core-shell particle structure. The core-shell impact modifier may have two layers (elastomeric inner layer and hard shell, known as a soft-core core-shell copolymer), three layers (hard core/elastomeric layer/shell, known as a hard core core-shell copolymer) or any higher number of layers, such as a soft seed core surrounded by a hard core/an elastomeric intermediate layer/a second different elastomeric layer/and one or more shell layers. Other similar structures of multiple layers are known in the art.

In one preferred embodiment, the presence of a hard core layer provides a desirable balance of good impact strength, high modulus, and excellent UV resistance, not achieved with a core/shell modifier that possesses a soft-core layer. The hard core layer (Tg>0° C., preferably Tg>20° C.) is typically a single composition polymer, but can also include the combination of a small amount of a low Tg seed on which the hard core layer is formed. For example, a small 5% rubber core seed that becomes dispersed into a hard core layer would be included in the invention as a hard core layer, as long as the combination behaves as a hard core layer. The hard core layer can be chosen from any thermoplastic meeting the Tg requirements. Preferably, the hard core layer is composed primarily of methacrylate ester units, acrylate ester units, styrenic units, or a mixture thereof. Methacrylate esters units include, but are not limited to, methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate and 2-methoxyethyl methacrylate. Acrylate ester units include, but are not limited to, methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cycloheyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate and 2-methoxyethyl acrylate. Preferably the acrylate ester units are chosen from methyl acrylate, ethyl acrylate, n-butyl acrylate, 2-ethylhexyl acrylate and octyl acrylate. Styrenics units include styrene, and derivatives thereof such as, but not limited to, alpha-methyl styrene, and para methyl styrene. In one embodiment the hard-core layer is all-acrylic.

At least one intermediate layer or layers are elastomeric, having a Tg of less than 0° C., and preferably less than −20° C. Preferred elastomers include polymers and copolymers of alkyl acrylates, dienes, styrenics, and mixtures thereof. Preferably the soft intermediate layer is composed mainly of acrylate ester units. Acrylate ester units useful in forming the soft block include, but are not limited to, methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cycloheyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate and 2-methoxyethyl acrylate. Preferably the acrylate ester units are chosen from methyl acrylate, ethyl acrylate, n-butyl acrylate, 2-ethylhexyl acrylate and octyl acrylate. Useful dienes include, but are not limited to isoprene and butadiene. Useful styrenics include, but are not limited to alpha-methyl styrene, and para-methyl styrene. Preferably the total amount of elastomeric layer(s) in the impact modifier is from 30-90 weight percent, more preferably from 40-85 weight percent, and most preferably from 50-80 weight percent, based on the total of the impact modifier particle.

The shell layer can be made of one or more shell layers, having a Tg>0° C., more preferably Tg>20° C., preferably selected from the list above for the hard core. The shell layer may be the same or different composition from the hard core layer. A level of functionalization may be included in the shell, to aid in compatibility with the polymer matrix.

Preferably the multi-stage polymer is a three stage composition wherein the stages are present in ranges of 5 to 60 percent by weight, preferably 5 to 20 percent, of the first stage, 40 to 70 percent, preferably 50 to 70, of the second intermediate stage, and 10 to 50 percent, preferably 20 to 40, of the final stage, all percentages based on the total weight of the three-stage polymer particle.

In one embodiment the core layer is a crosslinked polymethylmethacrylate-ethylacrylate copolymer, the middle layer is a crosslinked polybutylacrylate-styrene copolymer, and the outer shell is a polymethylmethacrylate-ethylacrylate copolymer.

The multi-stage polymer can be produced by any known technique for preparing multiple-stage, sequentially-produced polymers, for example, by emulsion polymerizing a subsequent stage mixture of monomers in the presence of a previously formed polymeric product. In this specification, the term "sequentially emulsion polymerized" or "sequentially emulsion produced" refers to polymers which are prepared in aqueous dispersion or emulsion and in which successive monomer charges are polymerized onto or in the presence of a preformed latex prepared by the polymerization of a prior monomer charge and stage. In this type of polymerization, the succeeding stage is attached to and intimately associated with the preceding stage.

If the impact modifier particle is not a composite particle, it may also be a highly R.I. mismatched impact modifier. Core-shell impact modifiers are preferred, and the following description will refer to core-shell impact modifiers, though the principles described apply also to other types of impact modifiers. In the case of a core-shell polymer, at least one layer of the core-shell impact modifier has an R.I. difference of greater than 0.005 units from a $2^{nd}$ layer of the impact modifier (such as hard core vs elastomeric layer, elastomeric layer vs shell, hard core vs shell).

The impact modifier particles are present in the final impact-modified thermoplastic composition at a level of from 5 to 80 weight percent, preferably 10 to 45 weight percent, and more preferably from 20 to 40 weight percent, based on the overall composition.

Matrix:

The matrix polymer in which the core-shell particles are blended may be any transparent, thermoplastic polymer. Especially useful transparent thermoplastic polymers include, but are not limited to crystal polystyrene; polyethylene terephthalate (PET); a transparent, especially clarified, polyolefin, for example clarified polypropylene; acrylics; a transparent polyamide; styrene acrylonitrile (SAN) and polycarbonate.

Acrylics, polystyrene, styrene acrylonitrile and polycarbonate are the preferred transparent plastics due to their ease of processing, commercial availability and high transparency.

Especially preferred is an acrylic polymer or acrylic polymer alloy. "Acrylic polymer", as used herein is meant to include polymers, copolymers and terpolymers formed from alkyl methacrylate and alkyl acrylate monomers, and mixtures thereof. The alkyl methacrylate monomer is preferably methyl methacrylate, which may make up from 50 to 100 percent of the monomer mixture. 0 to 50 percent of other acrylate and methacrylate monomers or other ethylenically unsaturated monomers, included but not limited to, styrene, alpha methyl styrene, acrylonitrile, and crosslinkers at low levels may also be present in the monomer mixture. Other methacrylate and acrylate monomers useful in the monomer mixture include, but are not limited to, methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, glycidyl methacrylate, dimethylamino ethyl acrylate and methacrylate monomers. Alkyl (meth) acrylic acids such as methacrylic acid and acrylic acid can be useful for the monomer mixture. Most preferably the acrylic polymer is a copolymer having 70-99.5 weight percent of methyl methacrylate units and from 0.5 to 30 weight percent of one or more $C_{1-8}$ straight or branched alkyl acrylate units.

In one embodiment, the acrylic polymer has a weight average molecular weight of between 50,000 and 500,000 g/mol, and preferably from 75,000 and 150,000, as measured by gel permeation chromatography. The molecular weight distribution of the acrylic polymer is monomodal or multimodal and the polydispersity index is higher than 1.5.

In another embodiment, the acrylic polymer has a weight average molecular weight higher than 500,000 g/mol, and preferably higher than 1,000,000 g/mol, as measured by gel permeation chromatography. The molecular weight distribution of the acrylic polymer is monomodal or multimodal and the polydispersity index is higher than 4.

In another embodiment, the acrylic polymer comprises a blend of two or more of the polymers.

In another embodiment, a portion of the acrylic polymer is cross-linked into polymeric particles with a particle size between 0.5 microns and 1,000 microns.

Acrylic alloys are blends of one or more acrylic polymers with one or more other polymers which are compatible, semi-miscible, or miscible with the acrylic polymer of the alloy composition. In a preferred embodiment, the acrylic alloy is miscible, where the polymers capable of being blended with the acrylic polymer in a ratio such that a single intimate mixture is generated without separation into distinct bulk phases.

In one embodiment, the other polymer(s) are low melt viscosity polymers. A "low melt viscosity polymer", as used herein means polymers having a melt flow rate of more than 10 g/10 minutes as measured by ASTM D1238 at 230° C./10.4 kg of force. The low melt viscosity polymer of the invention does not include acrylic polymers. The low melt viscosity polymer of this invention includes polyesters, cellulosic esters, polyethylene oxide, polypropylene glycol, polyethylene glycol, polypropylene glycol, styrene-acrylonitrile copolymers, polyvinyl chloride, polyvinyl acetate, polyvinyl alcohol, ethylene-vinyl acetate copolymers, olefin-acrylate copolymers, olefin-acrylate-maleic anhydride copolymers, and maleic anhydride-styrene-vinyl acetate copolymers. Useful polyesters include, but are not limited to: poly(butylene terephthalate), poly(ethylene terephthalate), polyethylene terephthalate glycol, polylactic acid, and polyhydroxy butyrate. A preferred polyester is polylactic acid. Useful cellulosic esters include, but are not limited to: cellulose acetate, cellulose triacetate, cellulose propionate, cellulose acetate propionate, cellulose acetate butyrate, and cellulose acetate phthalate.

In one embodiment, the low melt viscosity polymer has a weight average molecular weight higher than the entanglement molecular weight of that polymer, as measured by gel permeation chromatography.

In another embodiment, the water solubility of the low melt viscosity polymer is lower than that of the acrylic polymer of the invention.

The low melt viscosity polymer of the invention makes up from 5 to 60 weight percent of the total alloy composition, preferably from 9 to 40 weight percent.

The acrylic alloy of the invention can also be an alloy in any weight ratio of acrylic polymer and polyvinylidene fluoride.

In addition to the impact modifier composite composition, the acrylic matrix may also contain one or more other additives that are typically used in the industry, at usual amounts. Preferably these additives are refractive index matched—meaning having a refractive index difference of less than 0.01, preferably less 0.005, and more preferably less than 0.003 with the matrix polymer, or do not appreciably change the refractive index of the matrix polymer. Useful additives include, but are not limited to, processing aids, plasticizers, lubricants, flame retardants, heat resistance improvers, anti-oxidants, mold-release agents, nucleating agents, flow modifiers, dyes, colorants, anti-static agents, electrical conductivity additives, anti-fogging agents, anti-foaming agents, and fungicides.

There are several ways to practice the invention, in which R.I. mismatched matrix polymer and impact modifier particles or impact modifier composite particles are combined to form a transparent composition. These include, but are not limited to, having an impact modifier composite particle having a mis-matched R.I. to the matrix; having a highly R.I. mismatched impact modifier where at least one layer of the core shell has an R.I. that is ±0.005 units from a $2^{nd}$ layer; making a very low R.I. particle using monomer units with low R.I., such as fluorinated acrylics or polypropylene glycol-based monomers; and replacing traditional crosslinkers (like divinylbenzene, allyl methacrylate, diol di(meth)acrylates, etc) with polymeric crosslinking groups (like polypropylene glycol diacrylate, vinyl terminated fluoropolymers, silicones) to decrease crosslinking density while increasing energy adsorption, and potentially decreasing R.I. further.

Impact Modifier Composite Particles

The impact modifier (preferably core-shell) polymers are modified by the intimate addition of one or more polymeric process aids (dispersing aids) to the particle structure, resulting in an impact modifier composite particle. The polymer process aids are physically or chemically attached to, or associated with, the core-shell polymer. This combination can be through physical entaglements, encapsulation, van der Waals forces, hydrogen bonding, or chemical bonding.

The process aids are preferably compatible with both the matrix and core-shell polymers. Additionally, the refractive index of the composite particles are greater than 0.005, preferably greater than 0.008, more preferably greater than 0.01, and even greater than 0.012 units different (plus or minus) compared to the refractive index of the matrix polymer.

Useful process aids include, but are not limited to high molecular weight (>1,000,000 polymethyl methacrylate polymers and copolymers having greater than 80 weight percent, and preferably greater than 90 weight percent of methyl methacrylate monomers, the remaining monomer units being preferably $C_{1-4}$ alkyl methacrylates.

The process aids may perform any of several different functions, such as aiding in the isolation of the impact modifier—providing anti-caking of the core-shell particles during drying, allowing for a higher rubber modifier in the collected particles; and increasing the dispersibility—rate of dispersion and homogeneity of the dispersion of core-shell particles into the matrix.

The core-shell impact modifier composite particles may be produced by means known in the art, including but not limited to cospray-drying as separate streams into a spray-dryer; blending of the core-shell particles and process aids as a dispersion, and spray-drying the mixture; co-coagulation; co-freeze-drying; applying a dispersion or solution of the process aids onto the core-shell powder, followed by drying; physical blending of the impact modifier and process aid powders—which increases homogeneity in the powder form and leads to a more homogeneous blend into the matrix in a melt-blending; and physical blending followed by a weak melt blending of the impact modifier and process aid powders allowing for softening and adhesion of the particles without a full melt.

The polymeric process aid can be combined with the core-shell particles at any level of from 1 to 75 weight percent of process aid to 25 to 99 weight percent of core-shell impact particle—depending of the refractive index difference between the process aid and the matrix polymer. A very low level of highly mis-matched process aid can raise or lower the refractive index of the composite particle to mismatch with the polymer matrix. Generally at least 3 weight percent, preferably at least 10 weight percent, more preferably at least 15 weight percent, more preferable at least 20 percent, and even more preferably at least 25 weight percent, and even greater than 30 weight percent of the dispersing aid is used for repeatedly 97, 90, 85, 80, 75, and 70 weight percent of core-shell modifier. The level of dispersing aid can be as high as 50 weight percent to 50 weight percent of core-shell particles, and even as high as 75 weight percent for 25 weight percent of core-shell particles.

The impact modifier composite particles of the invention present several advantages over un-modified core-shell particles. These advantages include: a higher percentage rubber modifier particle can be collected as a powder, making it possible to get as much as a 20% increase in impact resistance compared to the addition of more shell material (higher % shell). Also the composite particle does not need to be refractive index matched with the polymeric matrix, as in the art, which provides a greater flexibility in formulating impact-modified transparent thermoplastic system. Core-shell particles that normally do not disperse in a matrix can be used with the higher level of dispersing aid. Further, a greater level of dispersing aid compared to about a 3-5 weight percent level of dispersing aid produces a very homogeneously dispersed system that provides excellent impact properties.

The composition of the invention can be used for making impact-modified, transparent polymer articles from the melt, including sheets, films, profiles by means including, but not limited to extrusion, molding, co-extrusion, and injection molding. Sheets can further be processed, such as by thermoforming, into useful articles.

Highly Mis-Matched R.I. Layers

Another highly mismatched matrix/core shell particle system occurs when a highly refractive index mismatched shell (compared to the matrix) is placed in the same modifier as a relatively matched elastomeric layer or in the same particle as a relatively matched hard core. Frequently the shell is chosen to achieve desirable core-shell properties in the presence of little or no process aid, such as spray-dryability, anti-caking, etc. The optimal shell for the task may be chosen dependent on desired properties and not dependent on refractive index restraints, providing for formulation flexibility. The ideal core-shell polymer may be significantly R.I. mismatched. In this embodiment the hard core layer can be chosen to match or not match the R.I. of the elastomeric layer. Since the refractive index of a core-shell impact modifier is greatly affected by the shell polymer, the core-shell polymer particle will have a measured R.I. that is influenced greatly by the shell polymer. In one embodiment, the difference between the refractive index of the shell polymers and either the hard core or elastomeric layer is at least 0.005, preferably greater than 0.01 and more preferably greater than 0.015. On melt-blended with the matrix, the R.I. mismatched impact modifier is dispersed into the matrix, resulting in a transparent, impact-modified composition.

Another highly mismatched matrix/core shell particle system occurs when a highly refractive index mismatched hard core (compared to the matrix) is placed in the same modifier as a relatively matched elastomeric layer or in the same particle as a relatively matched shell. Frequently the hard core is also chosen to achieve desirable core-shell properties in the presence of little or no process aid, such as spray-dryability, anti-caking, weatherability etc. The optimal hard core for the task may be chosen dependent on desired properties and not dependent on refractive index restraints, providing for formulation flexibility. The ideal core-shell polymer may be significantly R.I. mismatched. In this embodiment the elastomeric layer can be chosen to match or not match the R.I. of the shell. Since the refractive index of a core-shell impact modifier is greatly affected by the inner core polymer, the core-shell polymer particle will have a measured R.I. that is different from the rubber layer or shell layer R.I. In one embodiment, the difference between the refractive index of the hard core and elastomeric layer polymers or shell is at least 0.005, preferably greater than 0.01 and more preferably greater than 0.015. On melt-blended with the matrix, the R.I. mismatched impact modifier is dispersed into the matrix, resulting in a transparent, impact-modified composition.

Another highly mismatched matrix/core shell particle system occurs when a highly refractive index mismatched elastomeric layer (compared to the matrix) is placed in the same modifier as a relatively matched hard core or in the same particle as a relatively matched shell. Frequently the elastomeric layer is also chosen to achieve desirable core-shell properties, such as impact performance. The optimal elastomeric layer for the task may be chosen dependent on desired properties and not dependent on refractive index restraints, providing for formulation flexibility. The ideal core-shell polymer may be significantly R.I. mismatched. In this embodiment the hard core can be chosen to match or not match the R.I. of the shell. Since the refractive index of a core-shell impact modifier is greatly affected by the elastomeric polymer, the core-shell polymer particle will have a measured R.I. that is different from the hard core or shell layer R.I. In one embodiment, the difference between the refractive index of the elastomeric layer and hard core polymers or shell polymer is at least 0.005, preferably greater than 0.01 and more preferably greater than 0.015. On melt-blended with the matrix, the R.I. mismatched impact modifier is dispersed into the matrix, resulting in a transparent, impact-modified composition.

In any of these highly mismatched matrix/core shell particle system, the level of process aid could be low, or even zero, though it would be possible to optimize an impact modified system using several techniques disclosed herein.

It has been found that the mismatch in R.I. of the layers can lead to better optical properties, and especially less haze evolution with temperature. In particular, utilizing this strategy allows one to maintain a relative change in haze of <100% even after a 25° C. change in temperature. The relative change in haze is defined by subtracting the lowest haze realized on the material from the measured haze at a given temperature and dividing the difference by the lowest haze realized for the material. Since the thermo-optic coefficient of a high Tg material is closer to zero than the elastomer (such as acrylic rubber), a rubber phase that is 0.004 units lower in RI compared to the matrix will keep dropping to an even greater RI mismatch at higher temperatures, however a material having a higher RI will average the RI to higher than the matrix, only dropping slightly as temperature is increased.

EXAMPLES

Core shell latexes were synthesized using an in-situ seeded process, where either a mix of monomers resulting in a Tg of 50-100° C. are reacted in the presence of water, potassium dodecylbenzenesulfonate, and potassium persulfate to form a seed with a defined particle size, preferably in the range of 50 nm-150 nm depending on the desired final particle size.

A mix of monomers with low Tg were polymerized onto this existing seed latex to make a core-rubber latex particle. This latex particle is grown further with high Tg monomer to provide a shell that is dispersable in the matrix. An additional shell was added on in some examples to improve recoverability.

Core-shell latexes were blended with a spray-drying aid latex and spray dried or freeze coagulated together. The resulting powders were melt pressed at 450° F. for 2 min with no pressure, then 5 minutes at 2,000 lbs pressure with a 1 mm spacer plate. RI was measured on an Abbe refractometer to the 4th decimal place using a brominated naphthylene refractive index matching fluid. The process can also be done using saturated aqueous ZnCl as an RI matching fluid.

Example 1: (Comparative)

A core-shell polymer was synthesized in an emulsion polymerization to yield an 80 nm core made of 95% pMMA, 4% BA, and 1% ALMA. (to equal 5% of total solids). To the core was added a mix of monomers containing 96.5% BA, 2.5% styrene, 1% ALMA (equal 68% of total solids) to form an elastomeric layer. Then a PMMA shell was added (6.8% of total solids). An additional shell of pure pMMA (20.2% of total solids) was added to make latex, 1a. The resulting latex was freeze coagulated and dried into a powder, 1b. The dried powder is then compounded into a blend of 50:50 polylactide:PMMA (1c) and made into resin pellets. The pellets were injection molded into ASTM parts, 1d.

Example 2

The resulting latex from Example 1 was blended with a latex containing >90% PMMA as a % of total solids (blended latex 2a), preferably with a Mw>1,000,000 g/mol, such that the core-shell modifier altogether makes up 75% of the total dry powder. The dried powder (2b) is then compounded into a blend of 64:36 polylactide:PMMA (2c) and made into resin pellets which are injection molded into ASTM parts (2d).

Results:

Minimum Film Forming Temperature (MFFT) has been found to be a good measure of how recoverable a latex is as a powder (Table 1), with a higher MFFT indicating a higher degree of recovery.

TABLE 1

| | MFFT of latex ASTM D2354 (1a, 2a) | R.I. of core-shell or core shell composite (1b, 2b) | R.I. of thermoplastic matrix (1c, 2c) | Haze ASTM D1003 (1d, 2d) | Izod (ft-lbs/in) ASTM D256 (1d, 2d) |
|---|---|---|---|---|---|
| Example 1 (comp) | 39° C. | 1.476 | 1.474 | 6.0% | 1.87 |
| Example 2 | 46° C. | 1.481 | 1.469 | 6.0% | 2.17 |

The data shows that the impact modifier composite particles, spray dried with PMMA modifier is more recoverable (higher MFFT), has a mismatched R.I. of 0.012 compared to the matrix. Both PLA/PMMA impact modifier blends are transparent (Haze 6%), with the composite impact modifier particles producing a composition having greater impact resistance.

Example 3: (Comparative)

A core-shell polymer was synthesized in an emulsion polymerization to yield an 90 nm core made of 59.8% pMMA, 40% BA, and 0.2% ALMA. (to equal 13.6% of total solids). To the core was added a mix of monomers containing 96.5% BA, 2.5% styrene, 1% ALMA (equal 59.4% of total solids) to form an elastomeric layer. Then a PMMA shell was added (6.8% of total solids). An additional shell of pure pMMA (20.2% of total solids) was added to make latex, 3a. The resulting latex was freeze coagulated and dried into a powder, 3b. The dried powder is then compounded into a blend of 50:50 polylactide:PMMA (3c) and made into resin pellets. The pellets were injection molded into ASTM parts, 3d.

Example 4

The resulting latex from Example 3 was blended with a latex containing >90% PMMA as a % of total solids (blended latex 4a), preferably with a Mw>1,000,000 g/mol, such that the core-shell modifier altogether makes up 85% of the total dry powder. The dried powder (4b) is then compounded into a blend of 57:43 polylactide:PMMA (4c) and made into resin pellets which are injection molded into ASTM parts (4d).
Results:

TABLE 2

|  | MFFT of latex ASTM D2354 (3a, 4a) | R.I. of core-shell or core shell composite (3b, 4b) | R.I. of thermoplastic matrix (3c, 4c) | Haze ASTM D1003 (3d, 4d) | Izod (ft-lbs/in) ASTM D256 (3d, 4d) | Dynatup Dart Drop (ft-lbs)-Total Energy to Break ASTM D3763 (3d, 4d) |
|---|---|---|---|---|---|---|
| Example 3 (comp) | 78° C. | 1.477 | 1.474 | 6.9% | 1.29 | 10.8 |
| Example 4 | 80° C. | 1.479 | 1.471 | 6.3% | 1.66 | 26.4 |

The data shows that the impact modifier composite particles, spray dried with PMMA modifier is more recoverable (higher MFFT), has a mismatched R.I. of 0.008 compared to the matrix. As compared to the impact modifier of examples 1& 2, there exists a greater mismatch between the layers (shell and hard core). Due to this higher level of mismatch, less process aid can be used in example 4 (15%) as compared to example 2 (25%). Both PLA/PMMA impact modifier blends are transparent (Haze 6%), with the composite impact modifier particles producing a composition having a much greater impact resistance as measured by both notched Izod and falling weight (Dynatup Dart Drop) impact.

Example 5: (Comparative)

A core-shell polymer was synthesized in an emulsion polymerization to yield an 90 nm core made of 95% pMMA, 4% BA, and 1% ALMA. (to equal 5% of total solids). To the core was added a mix of monomers containing 96.5% BA, 2.5% styrene, 1% ALMA (equal 70% of total solids) to form an elastomeric layer. Then a PMMA shell was added (6.25% of total solids). An additional shell of pure pMMA (18.75% of total solids) was added to make latex, 5a. The resulting latex was freeze coagulated and dried into a powder, 5b. The dried powder is then compounded into a blend of 50:50 polylactide:PMMA (5c) and made into resin pellets. The pellets were injection molded into ASTM parts, 5d.

Example 6

A core-shell polymer was synthesized in an emulsion polymerization to yield an 90 nm core made of 35% pMMA, 65% BA, and 1% ALMA. (to equal 15% of total solids). To the core was added a mix of monomers containing 96.5% BA, 2.5% styrene, 1% ALMA (equal 60% of total solids) to form an elastomeric layer. Then a PMMA shell was added (6.25% of total solids). An additional shell of pure pMMA (18.75% of total solids) was added. The resulting latex was blended with a latex containing >90% PMMA as a % of total solids (blended latex 6a), preferably with a Mw>1,000,000 g/mol, such that the core-shell modifier altogether makes up 75% of the total dry powder. The resulting latex was freeze coagulated and dried into a powder, 6b. The dried powder is then compounded into a blend of 64:36 polylactide:PMMA (6c) and made into resin pellets. The pellets were injection molded into ASTM parts, 6d.
Results:

TABLE 3

|  | MFFT of latex ASTM D2354 (5a, 6a) | R.I. of core-shell or core shell composite (5b, 6b) | R.I. of thermoplastic matrix (5c, 6c) | Haze ASTM D1003 (5d, 6d) | Izod (ft-lbs/in) ASTM D256 (5d, 6d) | Dynatup Dart Drop (ft-lbs)-Total Energy to Break ASTM D3763 (5d, 6d) |
|---|---|---|---|---|---|---|
| Example 5 (comp) | 73° C. | 1.476 | 1.474 | 6.9% | 2.58 | 17.5 |
| Example 6 | 64° C. | 1.478 | 1.469 | 3% | 2.51 | 24.5 |

The data shows that the use of a composite impact modifier particles that is significantly mismatched to the matrix (0.019 difference between matrix and modifier) combined with a highly R.I. mismatched impact modifier (shell layer vs elastomeric layer and shell layer vs. hard core both have R.I. mismatch of >0.005) results in a much better haze in the compounded product. The composite impact modifier particles produces a composition having similar notched Izod impact resistance but superior falling weight impact resistance. Due to the different nature of the impact modifiers, the composite particle has a lower MFFT but still recoverable by spray drying techniques.

Example 7

A core-shell polymer was synthesized in an emulsion polymerization to yield a core made of 74.8% pMMA, 25%

EA, and 0.2% ALMA. (to equal 12% of total solids). To the core was added a mix of monomers containing 84.6% BA, 14.4% styrene, 1% ALMA (equal 54% of total solids) to form an elastomeric layer. Then a 95% PMMA 5% EA shell was added (17% of total solids). An additional shell of 95% pMMA 5% EA (17% of total solids) was added. The resulting core-shell contains highly mismatched R.I layers as the shell differs in R.I. from the elastomeric layer by >0.005. The resulting latex was freeze coagulated and dried into a powder, 7b. The dried powder is then compounded into a blend of 43:57 polylactide:PMMA (7c) and made into resin pellets. The pellets were injection molded into ASTM parts, 6d.

Results:

TABLE 4

|  | MFFT of latex ASTM D2354 (5a, 6a) | R.I. of impact modifier particle (7b) | R.I. of thermoplastic matrix (7c) | Haze ASTM D1003 (7d) | Izod (ft-lbs/in) ASTM D256 (5d, 6d) | Dynatup Dart Drop (ft-lbs)- Total Energy to Break ASTM D3763 (5d, 6d) |
|---|---|---|---|---|---|---|
| Example 7 | >90° C. | 1.492 | 1.471 | 44.0% | 1.70 | 22.5 |

This example demonstrates that with a large difference of 0.021 in R.I. between the modifier particle and matrix some degree of transparency can be maintained along with excellent MFFT and impact properties.

Example 8: (Comparative)

A core-shell polymer was synthesized in an emulsion polymerization to yield a hard core made of 95.8% pMMA, 4% EA, and 0.2% ALMA. (to equal 35% of total solids). To the core was added a mix of monomers containing 80.2% BA, 17.8% styrene, 2% ALMA (equal 45% of total solids) to form an elastomeric layer. Then a 96% PMMA, 4% EA shell was added (20% of total solids). This composition produces a highly matched core-shell, where every layer has an R.I. within 0.005 units of every other layer. The resulting latex was blended with a latex containing >90% PMMA as a % of total solids, such that the core-shell modifier altogether makes up 84% of the total dry powder. The resulting latex was freeze coagulated and dried into a powder, 8b. The dried powder is then compounded into a 100% PMMA matrix (8c) and made into resin pellets. The pellets were injection molded into ASTM parts, 8d.

Example 9

Examples 9 utilizes the latex, modifier particle, matrix and injection molded parts as example 4 (a, b, c, d).
Results:

TABLE 5

|  | R.I. of impacy modifier (8b, 9b) | R.I. of thermoplastic matrix (8c, 9c) |
|---|---|---|
| Example 8 (comp) | 1.492 | 1.492 |
| Example 9 | 1.479 | 1.471 |

The injection molded 2" by 3" plaques of 8d and 9d were placed into a oven at 60° C. for ~1 hour. Parts were removed from the oven and measured for haze according to ASTMD1003 while plaque temperature was being monitored by an infrared measuring device (IR gun). FIG. 1 demonstrates the change in % haze (as compared to the lowest haze recorded for the plaque). As is clearly demonstrated, the use of both a core shell particle with highly mismatched layers and a highly mismatched impact modifier particle and matrix (in example 9) results in a resin that has a much more gradual change in haze with increasing temperature, significantly less <100% relative change after a 25° C. increase in temperature.

What is claimed is:

1. A transparent, impact-modified composition comprising:
   a) 20-95 weight percent of a thermoplastic matrix, and
   b) 5 to 80 weight percent of composite impact modifier particles, wherein said composite impact modifier particles comprise from 10 to 75 weight percent of one or more polymeric process aids, and from 25 to 90 weight percent of impact modifier particles, wherein said process aids and said impact modifier are physically and/or chemically attached,
   wherein the difference in refractive index (R.I.) between the thermoplastic matrix and composite impact modifier particles is greater than +/−0.008, and wherein said transparent impact-modified composition has a haze of less than 40, and a total white light transmission of greater than 50, as measured by ASTM D1003 on a plaque having a thickness of 3 mm.

2. The transparent, impact-modified composition of claim 1, wherein the difference in refractive index between the thermoplastic matrix and impact modifier particles is greater than +/−0.010.

3. The transparent, impact-modified composition of claim 1, wherein the difference in refractive index between the thermoplastic matrix and impact modifier particles is greater than +/−0.012.

4. The transparent, impact-modified composition of claim 1, wherein said impact modifiers are selected from the group consisting of core-shell impact modifiers, linear block copolymers, and nano-structured latex particles.

5. The transparent, impact-modified composition of claim 1, wherein said impact modifier has a core-shell polymer structure.

6. The transparent, impact-modified composition of claim 5, wherein said core-shell polymer comprises one or more layers having a refractive index of at least +/−0.005 units different from the R.I. of a different layer of the core-shell polymer.

7. The transparent, impact-modified composition of claim 1, wherein said thermoplastic matrix is an acrylic.

8. The transparent, impact-modified composition of claim 7, wherein said matrix is an acrylic matrix comprising from 50 to 100 weight percent of methylmethacrylate units.

9. The transparent, impact-modified composition of claim 7, wherein said acrylic matrix is an alloy comprising 40-95 percent by weight of acrylic polymer, and from 5-60 weight percent of a low melt viscosity polymer.

10. The transparent, impact-modified composition of claim 9, wherein said acrylic matrix alloy comprises from 5-60 weight percent of polylactic acid.

11. The transparent, impact-modified composition of claim 1, wherein said polymeric process aid comprises a polymethyl methacrylate polymer or copolymer wherein said copolymer comprises more than 80 weight percent of methyl methacrylate monomer units.

12. The transparent, impact-modified composition of claim 11, wherein said polymeric process aid comprises a polymethyl methacrylate copolymer having greater than 80 weight percent of methyl methacrylate monomer units and at least 1 percent by weight of ethyl acrylate monomer units.

13. The process of claim 1, wherein the difference in refractive index between the thermoplastic matrix and impact modifier particles is greater than +/−0.010.

14. The transparent, impact-modified composition of claim 12, wherein said polymethyl methacrylate polymer or copolymer polymeric process aid has a molecular weight of greater than 1,000,000 g/mol.

\* \* \* \* \*